UNITED STATES PATENT OFFICE.

HANS LOESNER, OF LEIPSIC-LINDENAU, GERMANY.

PAINT.

SPECIFICATION forming part of Letters Patent No. 634,468, dated October 10, 1899.

Application filed December 15, 1897. Serial No. 662,065. (No specimens.)

*To all whom it may concern:*

Be it known that I, HANS LOESNER, of Leipsic-Lindenau, Saxony, Germany, have invented new and useful Improvements in Paint, of which the following is a specification.

This invention relates to the manufacture of a paint or oil color capable of resisting to an extremely high degree the destructive action of water and of the constituents of the atmosphere. For protecting, for instance, an iron body against rust it is necessary that the coating of paint be not only impervious to water, but be also completely air-tight. Any layer of paint which is not air-tight is also not vapor-proof, and as vapor is always contained in the atmospheric air this vapor will penetrate any paint which is not air-tight and will corrode the underlying body. By my invention a paint is produced which is absolutely weather-proof and which thoroughly protects the body to which it is applied against corrosion.

I add to varnish or to a drying-oil Portland cement and silicic acid, which greatly increases the durability of the paint without impairing its free-running quality. When a paint made according to my invention has dried, it forms a layer which is absolutely impervious and which completely resists the influences of the constituents of the atmospheric air and of vapor. The highest degree of hardness is obtained by adding together with the cement the silicic acid in the form of sand or quartz, forming silicates, which in time become as hard as stone and are completely and lastingly impervious to air. In applying the paint the cement will only become hardened by the moisture of the air, it being well known that cement sets as soon as moistened. Thus the cement does not impair the free application of the paint, which can be spread readily, while the objects painted will acquire a lac-like gloss.

The composition of the new paint will be understood from the following example: To from thirty to forty parts of varnish or a drying-oil is added a mixture of thirty parts of Portland cement, ten parts of silicic acid, and from twenty to thirty parts of a pigment, such as black, oxid-red, sulfate of barium, &c. The exact proportions depend, of course, upon the nature of the pigments employed, as some require more varnish or oil than others. The quantity of cement and silicic acid may be increased or reduced according to the particular use to which the paint is to be subjected, as a mass rich in cement is naturally of greater strength than a mass poor in cement. The cement and silicic acid must be finely powdered and carefully dried before being mixed with the varnish or oil, because moisture penetrating into the paint prior to its application will of course destroy prematurely the binding power of the cement.

It will be seen that by my invention I do not combine the paint with a body that is in itself weather-proof, but with a body the high-binding point of which becomes active only within the set paint, the formation of the impervious layer on the coated object taking place after the drying of the oil.

To demonstrate the impervious nature of my paint, I can subject it to the following proof: Scoured sheet-iron is painted twice uniformly with my cement color, and each coat is dried at ordinary temperature for five days. The painted sheet is then secured, painted side down, about fifty millimeters above the surface of a water-bath, and the latter is heated, so that the vapors strike the sheet. After the painted sheet has been subjected to the action of the vapors for about fifteen hours it is removed, its coat is soaked with anilin, the color is removed by a soft brush, and finally the sheet-iron is dried by alcohol, when the surface will be found completely undamaged. The action of the vapor during one hour is considerably more intense than that of rain, &c., for two or three months.

It will be seen that by my invention I obtain a pure varnish-cement silicic-acid combination, which upon hardening exercises a cementing action through the cement silicic-acid reaction—that is, the lime of the cement absorbs the moisture contained in the atmosphere after the oil has dried. Gradually this moisture is replaced by carbonic acid, upon which reacts the silicic acid, thus forming very gradually silicate of lime by displacing the carbonic acid. This is the generally-assumed cement reaction.

What I claim is—

A paint composed of a mixture of oil or varnish and powdered cement and silicic acid, substantially as specified.

In testimony whereof I have signed my name to this specification in the presence of two subscribing witnesses.

HANS LOESNER.

Witnesses:
RUDOLPH FRICKE,
B. H. WARNER, Jr.